Oct. 12, 1937.  E. A. ROCKWELL  2,095,833
AUTOMOBILE ACCESSORY OPERATING SYSTEM
Filed Oct. 16, 1933  9 Sheets-Sheet 1

Fig.1

INVENTOR
Edward A. Rockwell.
BY Arthur Wright
ATTORNEY

Oct. 12, 1937.  E. A. ROCKWELL  2,095,833
AUTOMOBILE ACCESSORY OPERATING SYSTEM
Filed Oct. 16, 1933  9 Sheets-Sheet 4

INVENTOR
Edward A. Rockwell
BY
Arthur Wright
ATTORNEY

Oct. 12, 1937.  E. A. ROCKWELL  2,095,833
AUTOMOBILE ACCESSORY OPERATING SYSTEM
Filed Oct. 16, 1933    9 Sheets-Sheet 5

INVENTOR
*Edward A. Rockwell*
BY
*Arthur Wright*
ATTORNEY

Fig.10

Oct. 12, 1937.  E. A. ROCKWELL  2,095,833
AUTOMOBILE ACCESSORY OPERATING SYSTEM
Filed Oct. 16, 1933  9 Sheets-Sheet 8

INVENTOR
Edward A. Rockwell
BY
Arthur Wright
ATTORNEY

Oct. 12, 1937.  E. A. ROCKWELL  2,095,833
AUTOMOBILE ACCESSORY OPERATING SYSTEM
Filed Oct. 16, 1933  9 Sheets-Sheet 9

Fig. 13

INVENTOR
Edward A. Rockwell.
BY
Arthur Wright
ATTORNEY

Patented Oct. 12, 1937

2,095,833

UNITED STATES PATENT OFFICE 2,095,833

AUTOMOBILE ACCESSORY OPERATING SYSTEM

Edward A. Rockwell, Chicago, Ill., assignor, by mesne assignments, to General Auto Parts Corporation, a corporation of Delaware Application October 16, 1933, Serial No. 693,743

21 Claims. (Cl. 180—53)

My invention relates particularly to a system for the operation of the various accessory features which may be used in connection with an automobile.

The object of my invention is to provide a system by means of which one or more of the different accessory features of an automobile may be effectively operated by pressure, either super- or sub-atmospheric or both. More particularly the object of my invention is to provide a pump mechanism adapted to supply super- and sub-atmospheric pressures whether singly or jointly.

A further object is to locate the source of pressures referred to in an advantageous manner.

Again, another object is to provide a system whereby such pressures may be always available in the operation of the car when either the engine is operating or the car is moving, or both, so that the source of operating pressures will not fail at any time during the operation of the car.

Thus, in the operation of the car equipped with my system the brake, for example, will be operable by the said pressure source whenever the car is in motion; also, the wind-shield wiper will be operated whenever the engine is in operation, but will still operate by the movement of the car in case it is no longer running, or even when the normal vacuum from the engine manifold would not be sufficient to operate the wind-shield wiper, as, for example, when the engine is operating under heavy loads. Similarly, the clutch will operate when either the engine is running or the car is moving, or both.

Furthermore, this system provides a fuel feed which is positive in action, but which, nevertheless, will not be thrown out of action by a vapor lock in the feed line; also the fuel feed, in case of any inaction of the pressure and vacuum feed, will operate effectively by gravity until the pressure and suction again come into action. In a similar way the feed will operate as a vacuum tank feed system operated by the suction of the engine alone in case of any failure of the operation of the pressure or in case of the failure of any auxiliary source of vacuum.

My system also provides an effective means for maintaining the accuracy of any liquid level gage by clearing the line with the aid of compressed air.

In accordance with my system, furthermore, in which certain of the parts are individually controlled by both vacuum and pressure, there is provided means for maintaining a constant differential between the vacuum and the pressure so as to maintain at all times a uniform operation of the part referred to.

Furthermore, in case of an accessory, the operation of which should be dependent upon the temperature of the engine, I have provided means whereby a thermostatic control is utilized in connection therewith, for instance,—in connection with the operation of the fan which is controlled by fluid pressure, the operation can be controlled by the temperature of the engine at any desired point, thereby constituting a great saving o power in the operation of the fan.

Furthermore, the system provides an entirely dependable source of super- and sub-atmospheric pressure inasmuch as I have equipped my system with a source of pressure driven by the engine and a source of pressure which is derived from the tractive effect of the automobile wheels, a well as a source of vacuum which may be derived from the engine manifold or from a pump driven by the engine, or from a pump driven by traction of the wheels, the arrangement being such tha in case of the failure of any of the sources, another will operate.

The pump construction is such, furthermore that it can be installed in the present type of automobile construction by mounting the same o the rear end of the transmission shaft wher it may be readily introduced and removed with minimum of cost and labor.

This general arrangement also provides th system with an adequate supply of sub-atmos pheric pressure without materially affecting th vacuum in the engine manifold, which woul otherwise detrimentally affect the gaseous fue mixture, and yet at the same time the pum which is utilized as the auxiliary source of suc tion may be small and inexpensive due to th high speed of the transmission drive shaft fror which it is operated.

Without this arrangement, in the case of th vacuum operated brake the brake would be ur duly slow in operation.

While my invention is capable of being show in many different ways, I have shown only cer tain embodiments therewith in the accompany ing drawings, in which—

Figure 1:
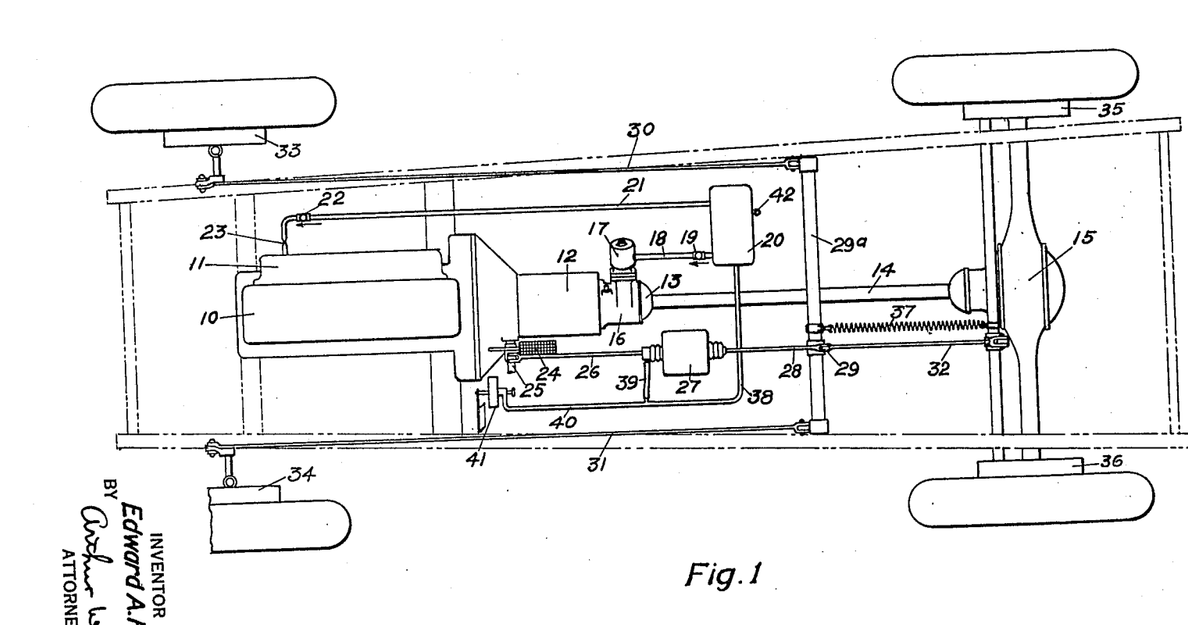
Fig. 1 is a diagrammatic plan view showing simplified form of the construction as applied t the operation of a brake and a wind-shield wipe

Referring to Fig. 1, I have shown an engine 10 of an automobile having an inlet manifold 11. Rearward of the engine 10 there is provided the usual transmission unit 12 which is connected to a universal joint 13 of the usual type and a propeller shaft 14 with a rear axle assembly 15 of the usual construction. Between the transmission 12 and the universal joint 13 there is provided a casing 16 which forms a housing of a vacuum pump 17. A suction pipe 18, having a check valve 19 opening in the direction indicated by the arrow, connects the pump 17 with an equalizing tank 20. A suction pipe 21, having a check valve 22 opening in the direction of the arrow, connects the tank 20 with the inlet manifold 11. As shown in the drawings, I have provided a restriction 23 in the pipe 21, to be referred to hereinafter more in detail. The usual brake pedal 24 is provided, which is fulcrumed on a crosspin 25 and is connected by a link 26 with a brake booster or vacuum actuating device 27 of any known type. From the booster 27 there is provided a link 28 controlled by the booster or vacuum device, which is connected to a lever 29 secured to a cross-shaft 29a from which shaft the usual pull rods 30, 31 and 32 extend to front brakes 33 and 34 and rear brakes 35 and 36 respectively. A restricting spring 37 serves to return the braking system to its disengaged position when the braking force is released. A pipe 38 is connected to the tank 20 and is provided with a branch 39, as, for example, a flexible hose, which leads to the booster 27. Another branch 40 is connected to a wind-shield wiper 41 of any desired vacuum-operated type of construction. A vacuum release or limiting valve 42 of any suitable type is mounted on the tank 20.

Figure 2:
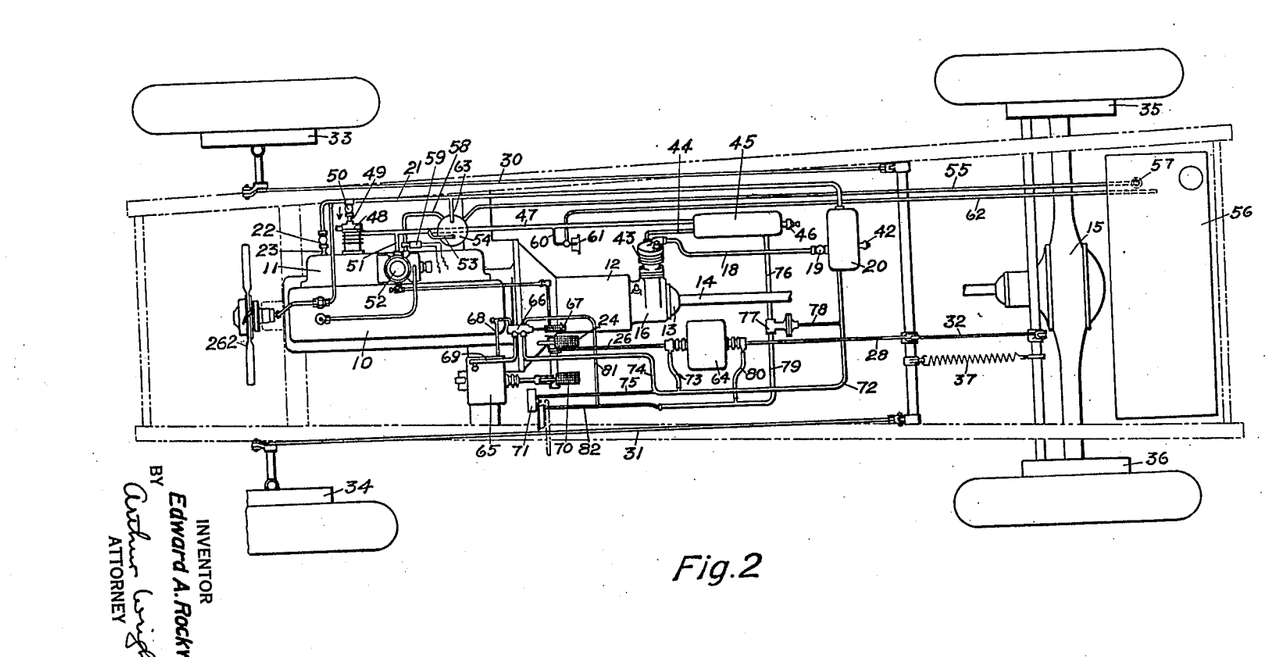
Fig. 2 is a diagrammatic plan view of the sy tem made in accordance with my invention.
Figure 3:
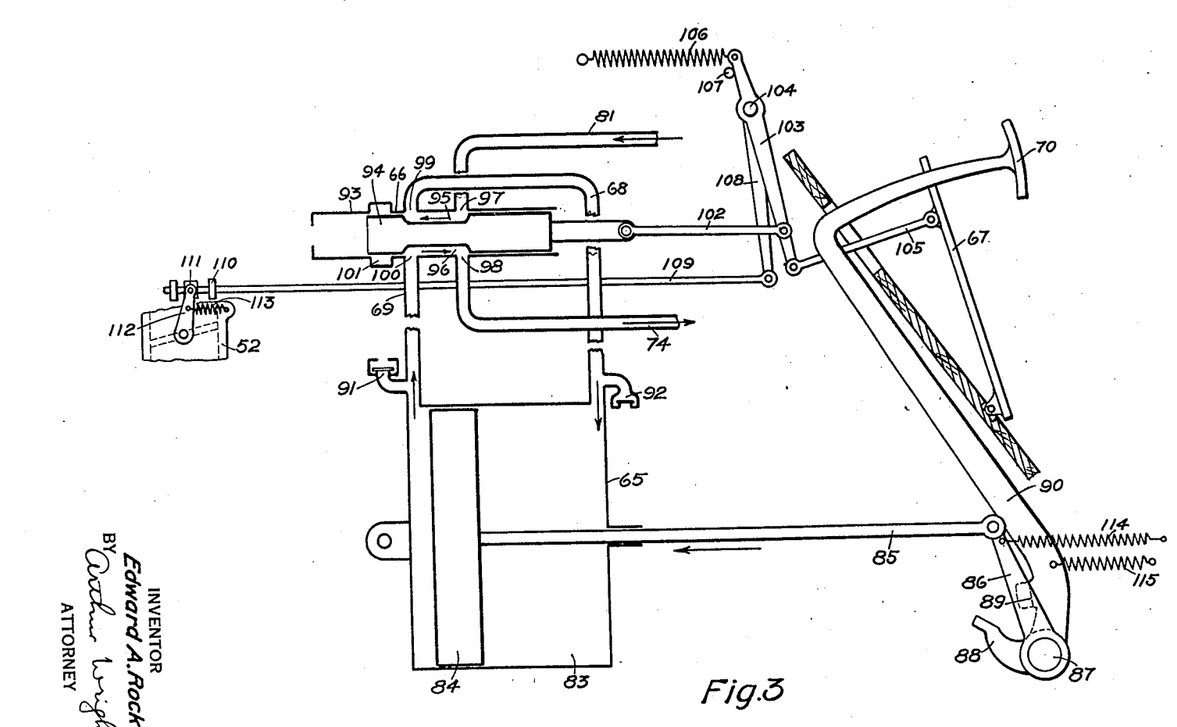
Fig. 3 is a diagrammatic vertical section of clutch operated in accordance with my system ar in which vacuum and pressure together or either alone is arranged to operate the same.
Figure 6:
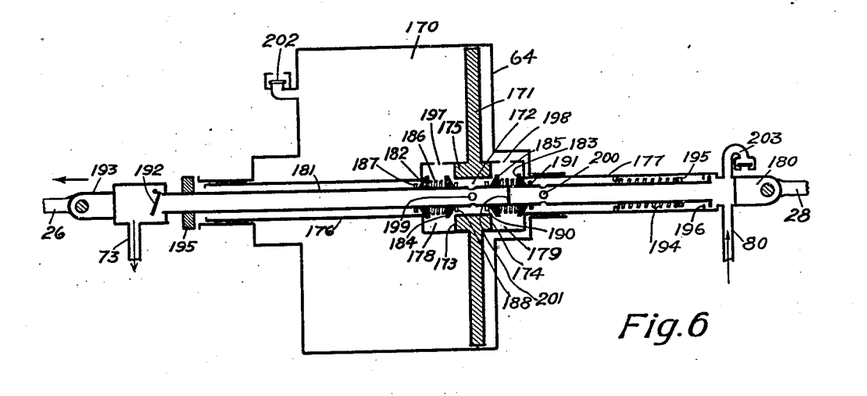
Fig. 6 is a diagrammatic vertical section of the vacuum and pressure control used in connection with the brake and in which vacuum and pressure together or either alone are capable of operating the same.
Figure 9:
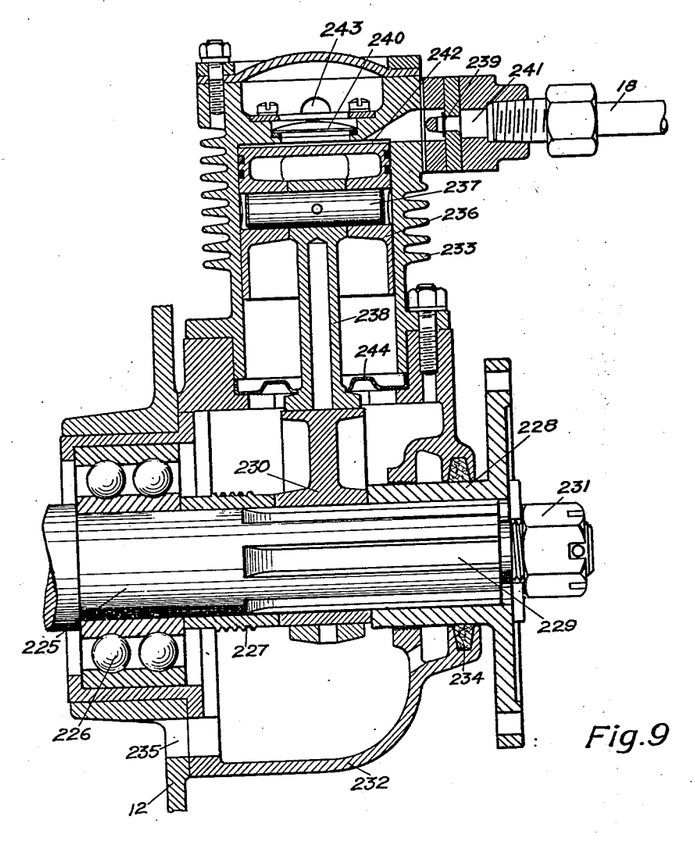
Fig. 9 is a vertical section of the pump adapted to supply both the vacuum and pressure or vacuum alone.

Referring to Fig. 2, the parts therein which are found in Fig. 1 have the same numbers as in said Fig. 1. In this instance I have provided a pump 43 adapted to furnish both pressure and vacuum, and which may be of a type as shown in Fig. 9. A pressure pipe 44 delivers the pressure to a pressure tank 45 which is equipped with a relief or pressure limiting valve 46 of any desired character. A second pressure pipe 47 connects the tank 45 with the discharge side of a pump 48, preferably mounted on the engine 10 and actuated therefrom in any desired manner. A short suction pipe 49, having an inwardly opening check valve 50, connects the suction side of the pump 48 with the vacuum pipe 21. This pump 48 may also be a pressure vacuum pump constructed as shown in Fig. 9. A branch pipe 51 leads from the pressure pipe 47 to a carbureter 52 of any type, adapted to employ air pressure to assist vaporization of the fuel, but which may be, for example, a carbureter of the type set forth in my application upon Carbureter, Serial No. 693,742, filed on the 16th day of October, 1933. A second branch pipe 53 leads from the pressure pipe 47 to a fuel feeding device 54 such as that shown diagrammatically in Fig. 6. A pipe 55 is provided for supplying fuel from a low level storage tank 56 to the fuel feeding device 54, a check valve 57 being provided at the rear end of the pipe 55. A fuel delivery pipe 58 connects the fuel feeding device 54 with the carbureter 52. When the carbureter 52 is of a floatless or positive fuel pressure type, a solenoid valve 59 of the well-known type, and connected in circuit with the ignition switch of the engine, may be carried in the delivery pipe 58 so that the said valve closes when the engine is stopped and prevents subsequent flooding of the carbureter. A third branch pipe 60 leads from the pressure pipe 47 to a hydrostatic fuel gage 61 such as that shown diagrammatically in Fig. 7. From the gage 61 a tube 62 leads into the gasolene tank 56. A branch vacuum pipe 63 connects the fuel feeding device 54 with the vacuum pipe 21. A brake booster or actuator 64 is provided, the arrangement of which may be as shown in Fig. 6. A clutch actuator 65 is also provided, the detail construction of which may be as shown in Fig. 3. A control valve 66 for the same is connected to an accelerator pedal 67, the detail construction of which is shown in Fig. 3. A pressure pipe 68 and a vacuum pipe 69 lead from the valve 66 to the actuator 65. A clutch pedal 70, of the usual type, is provided in connection therewith. A windshield wiper 71, the details of which are shown in Fig. 4, and a vacuum supply pipe 72, which is connected to the tank 20, has branches 73, 74, and 75 leading, respectively, to the brake booster 64, the clutch valve 66 and the windshield wiper 71. A pipe 76 connects the pressure tank 45 with a regulating valve 77, the details of which are set forth in Fig. 8. A tube 78 connects the valve 77 with the vacuum pipe 72. A pressure supply line 79 leads from the regulating valve 77 and is provided with branches 80, 81 and 82 leading, respectively, to the brake booster 64, the clutch regulating valve 66 and the windshield wiper 71.

Referring to Fig. 3, the clutch actuator has a cylinder 83 in which there is a piston 84 connected by a rod 85 with a lever 86 on a clutch shaft 87. An arm 88 on the lever 86 is adapted to be engaged by a yielding pad 89 which is secured to a pedal lever 90 on which the pedal 70 is carried. On the clutch actuator there is provided a relief or check valve 91 which is connected to the main vacuum pipe 69 between the cylinder 83 and the control valve 66. An inwardly open relief or check valve 92 is provided in the pressure pipe 68 between the cylinder 83 and the control valve 66. Said control valve is provided with a cylinder 93 containing a slidable plunger 94 having upper and lower grooves 95 and 96 to cooperate with openings 97 and 98 in the pressure supply pipe 81 and the vacuum supply pipe 74, and openings 99 and 100 in the pressure and vacuum pipes 68 and 69, respectively. Furthermore, the cylinder 66 is provided with an annular recess 101 spaced a short distance to the left of the openings 99 and 100. A link 102 connects the plunger 94 with a lever 103 fixed on a shaft 104, a second link 105 being provided between the lever 103 and the accelerator pedal 67. A retracting spring 106 is attached to the upper end of the lever 103, the movement of which is limited by a stop 107. A second lever 108 is also fixed on the shaft 104 and is pivoted to a throttle rod 109 having a thrust collar 110 adapted to engage a slidable block 111 on the usual type of throttle lever 112 of the carbureter 52. Retracting springs 113, 114 and 115 are connected so as to retract the throttle lever 112, the lever 86 and the pedal lever 90, respectively.

Figure 4:
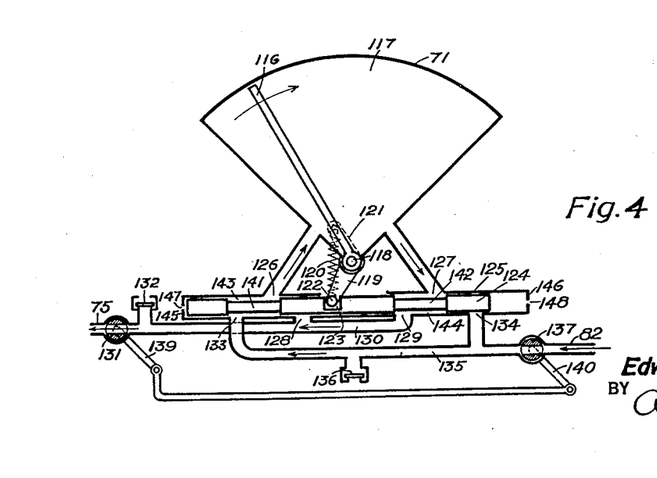
Fig. 4 is a diagrammatic vertical section of a windshield wiper operated in accordance with my system and in which vacuum and pressure together or either alone is adapted to operate the same.

Referring to Fig. 4, the windshield wiper 71 is shown having the usual oscillating vane 116 in a sector-shaped chamber 117, the vane 116 being fixed to a shaft 118 carrying the usual rotatable glass-wiping arm, not shown. A toggle lever 119, rotatably mounted on the shaft 118, is connected by a toggle spring 120 with a short lever 121 fixed on the shaft 118 and a round extension 122 on the lever arm 119 engages a notch 123 located in an elongated cylindrical valve member 124 slidable in a cylindrical casing 125. Ports 126 and 127 connect the interior of the casing 125 with the chamber 117 on the left and right sides of the vane 116, respectively. Vacuum ports 128 and 129 open into a manifold 130 which is connected through a manually operable valve 131 with the branch suction pipe 75, shown in Fig. 2. An outwardly opening relief valve 132 is positioned in the manifold 130. Pressure ports 133 and 134 open into a manifold 135 having an inwardly opening relief valve 136. The pressure manifold 135 is thence connected through a manually operable valve 137 with the branch pressure pipe 82, shown in Fig. 2. There is provided, furthermore, a manually shifting bar 138 which is connected so as to swing levers 139 and 140 of valves 131 and 137 respectively. The valve member 124 has two reduced portions 141 and 142 which provide annular spaces 143 and 144 inside the casing 125, the ends of said casing, 145 and 146, having vent holes 147 and 148 respectively.

Figure 5:
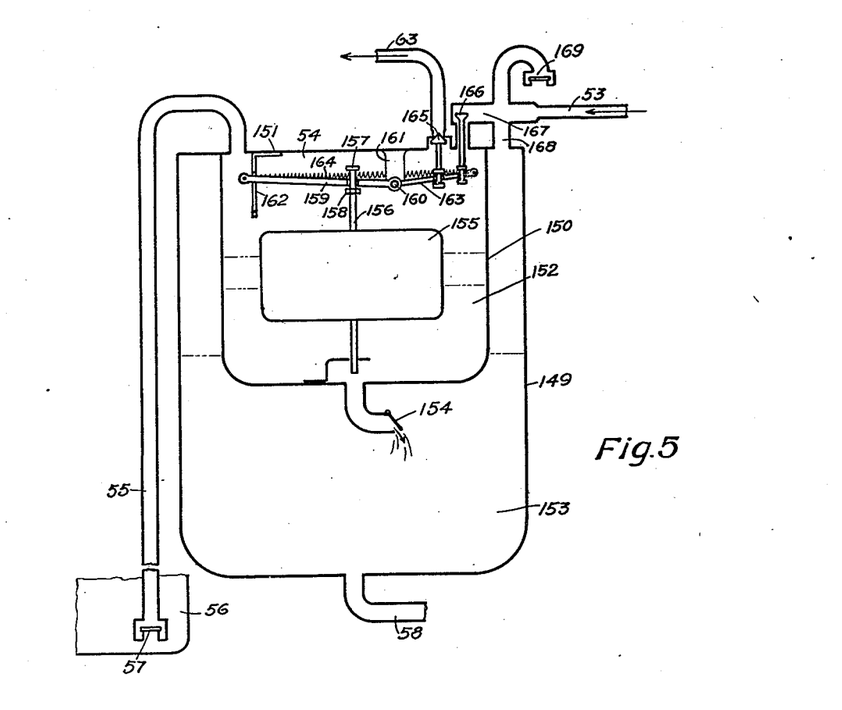
Fig. 5 is a diagrammatic vertical section of a fuel feed vacuum tank which can be operated also with the aid of pressure.

Referring to Fig. 5, outer and inner shells 149 and 150 are provided for the fuel feeding device 54, the same being provided with a head 151 so as to produce an upper chamber 152 and a lower and outer chamber 153. A check valve 154 opens outwardly from the upper chamber 152 into the lower chamber 153 and a float 155 in the upper chamber has a vertical stem 156 with collars 157 and 158 which engage with a toggle lever 159 carried by a pivot 160 on a downward extension 161 of the head 151. A stop strap 162 limits the upward and downward movement of the toggle lever 159, a notch being provided in the strap for this purpose, as shown in said figure. A second toggle lever 163 is also carried by the pivot 160 and connected to the lever 159 by a tension spring 164 so as to operate a vacuum valve 165 and a valve 166. The vacuum valve 165 controls the connection between the chamber 152 and the branch vacuum pipe 63 while the valve 166 controls the connection between the chamber 152 and the pressure or air manifold 167, which is connected to the branch pressure pipe 63 and an inwardly opening relief or air valve 169. Connected to the upper chamber 152 there is the fuel supply pipe 55, leading to the low level fuel tank 156 having therein the valve 57 already described. As already noted, the lower chamber 153 has in the bottom thereof a fuel delivery pipe 58 leading to the carbureter.

Referring to Fig. 6, I have shown a cylinder 170 of the brake booster 64, the same having a piston 171 which has therein a central hole 172 extending from the left face 173 to the right face 174 of a hub 175. Tubular members 176 and 177 are fastened, respectively, to the left and right ends of the hub 175 and define, accordingly, chambers 178 and 179, and are slidable in sealing relation within heads provided in the ends of the cylinder 170. The outer end of the tubular member 177 is closed and has an extension 180 for adjustment of the link 28. The branch pressure pipe 80 is connected into the side of the member 177. An inner tubular member or valve rod 181 carries air or pressure valves 182 and 183 and vacuum valves 184 and 185 slidable in sealing relation thereon. A spring 186 urges the air valve 182 and the vacuum valve 184 apart, stops 187 and 188 on the rod 181 limiting their possible separation. The air valve 183 and the vacuum valve 185 are similarly urged apart by a spring 189, their possible separation being limited by stops 190 and 191. A check valve 192 is located between the interior of the rod 181 and the branch vacuum pipe 73. An extension 193 of the rod 181 forms a connection for the link 26, as shown in Fig. 2. A spring 194 urges the inner rod 181 to the right relative to the members 176 and 177, a stop collar 195 limiting the possible relative motion in this direction. A stop ring 196 in the member 177 limits the motion of the rod 181 to the left relative to the members 177 and 176. I have, furthermore, provided orifices 197 and 198, respectively, for the chambers 178 and 179 opening therefrom to the cylinder 170. Also, holes 199 and 200 have been provided on the interior tubular rod 181, a sealing partition 201 being situated between the same. An outwardly opening relief valve 202 is provided on the cylinder 170 and an inwardly opening relief valve 203 is provided on the member 177.

Figure 8:
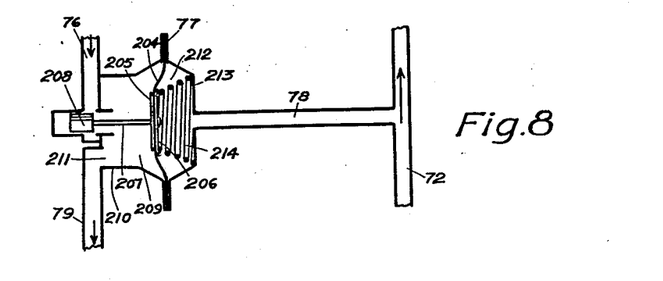
Fig. 8 is a diagrammatic horizontal section of the differential regulator for the vacuum and pressure, respectively.

Referring to the differential regulating valve, Fig. 8, I have provided a flexible diaphragm 204 clamped between central plates 205 and 206 on a stem 207 of a balanced valve 208. The valve 208 controls the opening between the pipe 76, Fig. 2, and a chamber 209 in a body 210 in front of the diaphragm 204. An opening 211 leads from the chamber 209 to the pressure supply line 79 Fig. 2. A second chamber 212, inside a cap 213 and behind the diaphragm 204, is connected through the pipe 78 with the vacuum supply pipe 72, as shown in Fig. 2. A spring 214 urges the diaphragm 204 to the left, tending to open the valve 208.

Figure 7:
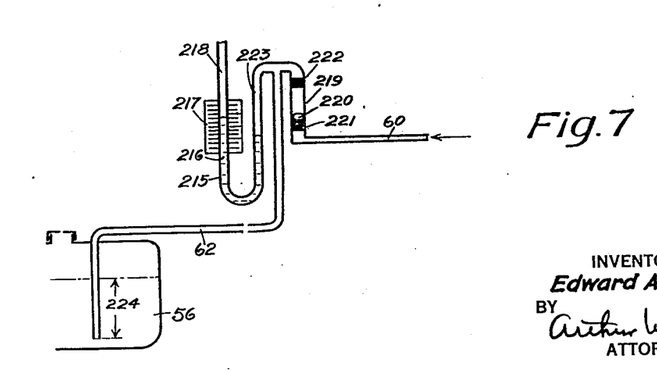
Fig. 7 is a diagrammatic vertical section of a gasoline gage used in my invention.

Referring to the hydrostatic gage diaphragm, Fig. 7, I have provided a U-shaped tube 215 containing a liquid 216 and having a reference scale 217 adjacent a left leg 218. A check valve 219, which may be the type comprising a valve of mercury 220 imposed on a porous plug 221 and retained by an upper porous plug 222, is connected between the pressure branch pipe 60, Fig. 2, and a right leg 223 of the U-shaped tube 215. The gage line 62, Fig. 2, is led from the top of the leg 223 to the bottom of the low-level fuel tank 56. The height of the fuel is shown at 224 in the tank 56 above the mouth of the gage line 62.

Referring to Fig. 9, I have provided a rear shaft 225, Figs. 1 and 2, with the usual bearings 226. The shaft 225 carries the usual speedometer worm 227 and the usual joint hub 228 fitted on a spline 229. An eccentric 230 also fitted on the spline 229, is disposed between the worm 227 and the hub 228, the three being clamped longitudinally by a nut 231. A casing 232 surrounds the worm 227 and eccentric 230 and carries thereon a compressor cylinder 233. The casing 232 is fastened to the transmission 12 in any suitable manner and contains the usual oil sealing means 234. An oil hole 235 opens from the interior of the casing 232 into the interior of the transmission unit 12. A piston 236, slidable in the cylinder 223, contains an oscillating wrist pin 237. An eccentric rod 238, fixed to the wrist pin 237, cooperates with the eccentric 230. An inlet valve 239 and an outlet valve 240 are provided which may be of the reed type. The valve 239 controls an inlet passage 241 from the suction pipe 18, Figs. 1 and 2, to a space 242 in the cylinder 233 above the piston 236. The discharge valve 240 controls a passage 243 which may open to the pressure pipe 44, Fig. 2, or to the open air, as in Fig. 1. At the bottom of the cylinder 233 there is provided an oil baffle 244.

Figure 10:
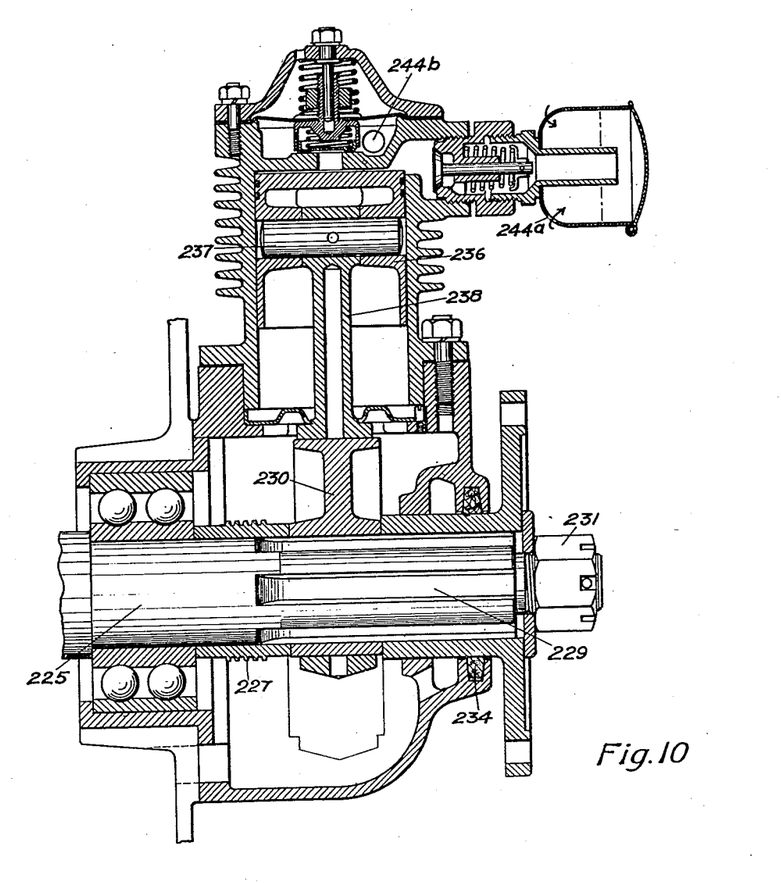
Fig. 10 is a similar view of the pump adapted to supply pressure.

The structure shown in Fig. 10, in which parts identical with those of Fig. 9 are denoted by the same numbers, has been fully described in my application on Fluid pressure brake, Ser. No. 239,899 filed December 14, 1927, now Patent No. 1,953,988, granted April 10, 1934 of which the present application is a continuation in part. In the said figure the pressure pump takes in air through ports 244a and the compressed air is delivered through an outlet vent 244b.

Figure 11:
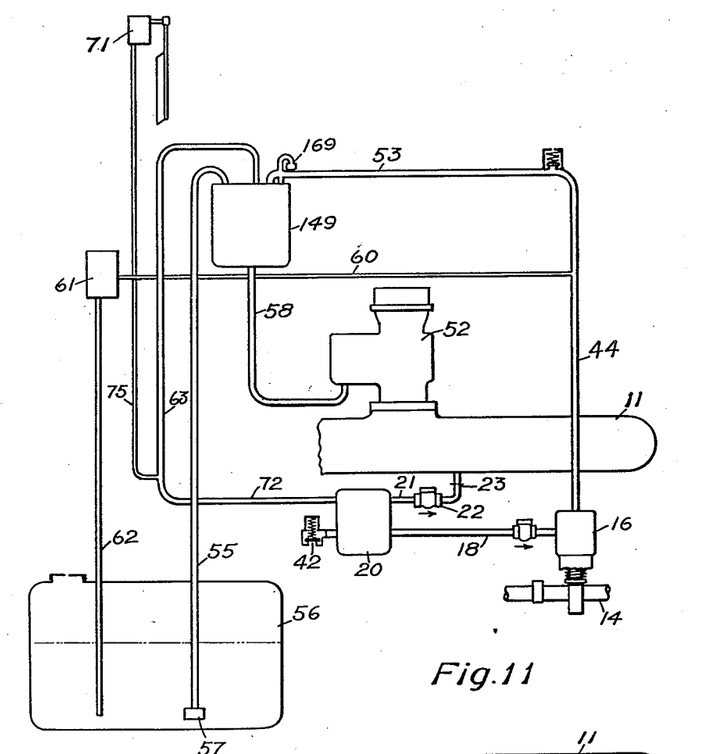
Fig. 11 is a diagrammatic vertical elevation of a system in which there is a fuel feed vacuum tank operated by pressure and vacuum or by the vacuum alone, a wind-shield wiper operated by the vacuum alone, and a gasoline gage operated by pressure alone, the same showing the engine driven pump adapted to supply both vacuum and pressure.

The structure as shown in Fig. 11 is an assembly of the line connections for the fuel feed, carbureter, windshield wiper and gasoline gage, all of which connections have been previously individually described.

Figure 12:
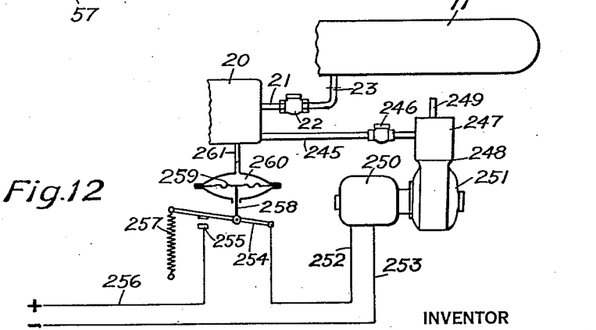
Fig. 12 is a diagrammatic plan view of an auxiliary suction supply pump adapted to be brought into action upon any failure of the manifold suction.

In Fig. 12 I have shown an apparatus including an auxiliary vacuum pump adapted to be brought into operation upon the failure of the vacuum from the manifold. In this construction the vacuum tank 20 is connected by a pipe 245 having a check valve 246 with a cylinder 247 of a vacuum pump 248 having an air exhaust 249. The vacuum pump 248 may be driven by an electric motor 250 adapted to drive the usual eccentric and piston of such a pump, arranged within a casing 251 and the cylinder 247, respectively. The current for the motor 250 is supplied through wires 252 and 253, the former leading to a switch arm 254 adapted to lead the circuit through a contact 255 in a wire 256, which completes the circuit from the source of current with the wire 253. A spring 257 tends to complete the circuit between the wires 252 and 256 but the arm 254 is normally held in the position shown in Fig. 12 so as to break the said circuit by means of a link 258 leading to a diaphragm 259 extending across a chamber 260 which is connected by a pipe 261 to the vacuum tank 20.

Figure 13:
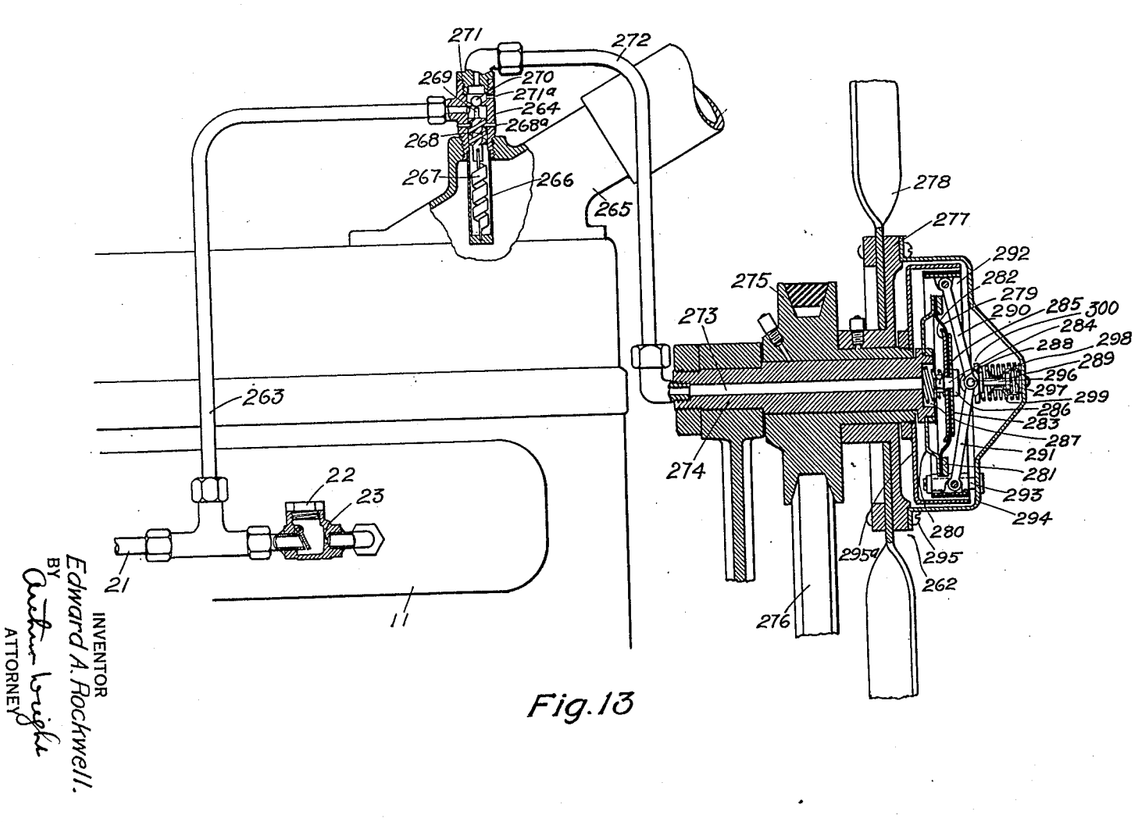
Fig. 13 is an elevation partly in section of a fan controlled by the temperature of the engine and actuated by suction from the engine manifold, or in case of failure of the suction from the manifold then from the auxiliary suction supply.

In Fig. 13 I have shown a construction in which the operation of an engine fan 262 is controlled by the temperature in the engine, and which is controlled by the suction from the pipe 21 connected to the vacuum tank 20 and to the engine manifold 11 by the pipe 21. In order that the fan 262 may be operated only when the temperature of the engine requires the additional cooling effect supplied by the said fan, I have provided a branch vacuum pipe 263 leading to a fitting 264 screw-threaded into a water circulating pipe 265 connected to the water jacket of the engine. Secured to the lower portion of the fitting 264 there is a thin metal casing 266 which extends downwardly into the body of water within the pipe 265, which casing 266 has a helical expansible metal element 267 adapted to expand and contract torsionally according to the temperature of the water in the engine jacket. This torsional movement is transmitted to a screw 268 cooperating with a pair of pins 268a to transform torsional into vertical movement, said screw 268 having at the upper end a pin 269 adapted to contact with a ball valve 270 in a valve chamber 271 provided with a small bleed hole 271a to release the vacuum when the valve is closed. Said chamber 271 leads to a pipe 272 which communicates with a passageway 273 passing through the center of a journal bearing 274 which carries a pulley 275 driven by a fan 276 from the motor shaft in the usual way. Loose on said pulley 275 there is provided a fan hub 277 to which fan blades 278 are secured in the usual way. When the ball valve 270 is opened by the rising temperature of the engine, the vacuum communicated through the passageway 273 is transmitted to a diaphragm 279 supported by a disk 280 on the journal bearing 274 and held in place by a clamping ring 281. The middle of the diaphragm 279 is held between the clamping disks 282 and 283 by means of a clamping pin 284 having a nut 285 on one end and a flanged head 286 on the other end. A spring 287 normally moves the diaphragm 279 to the right in Fig. 13 so that said head 286 forces a button 288 to the right as well as a pivot 289 for toggle levers 290 and 291, the other ends of which levers are secured to an expansible slit friction clutch band 292 which is supported by one or more bolts 293 from a cover plate 294 which is secured by screws 295 to the fan hub 277. This friction band 292, when expanded, acts as a clutch with the inner surface of a shell 295a, which is vented to the hub of the pulley 275. The said pivot 289 is guided by reason of the fact that the button 288 forms the head of a stem 296 having a flanged end 297 supported by a spring clip 298 on the said cover plate 294. A spring 299 is supported between said cover plate 294 and a washer 300 carried by the stem 289.

In the operation of my invention, when the vehicle, Fig. 1, is in motion, the drive shaft 14 is revolving and, consequently, the rear transmission shaft 225, Fig. 9, is also revolving. This motion occurs whether the vehicle is being driven by the motor or is coasting. The shaft 225 revolves the eccentric 230, reciprocating the piston 236 and alternately drawing air in through the valve 239 and discharging it through the valve 240. In the system shown in Fig. 1, in which vacuum only is employed, the air is discharged to the atmosphere, as noted in reference to Fig. 9, by the pump 17. The pumping action induces a partial vacuum in the tank 20, Fig. 1, through the pipe 18 and the check valve 19. This vacuum may be utilized through the pipe 38 to operate auxiliaries, such as the brake booster 27 and the wind-shield wiper 41. These auxiliaries are of well known types and their operation by vacuum is well understood, consequently no further explanation is necessary concerning them. From the foregoing it is clear that the pump 17, which may be of as large capacity as desired, furnishes an ample source of vacuum whenever the vehicle is in motion, the degree of vacuum in the tank 20 being limited, as desired, by the limiting valve 42 of the well known type. The pipe 21, Fig. 1, connected to the inlet manifold 11 through the check valve 22, furnishes a secondary source of vacuum to the tank 20. As the pump 17 supplies ample vacuum while the vehicle is in motion, the above secondary source is called upon only to supply the small amount of vacuum required when the car is stationary or nearly so, and the motor idling. The restriction 23 may therefore be employed to limit the passage to the manifold 11, thereby preventing interference with the proper fuel mixture in the latter. It will be noted from the foregoing that this system, by assuring ample vacuum at all times when either the vehicle or motor is running, eliminates the dangers and inconveniences common to previous systems, in which large throttle opening or engine stoppage results in failure of the vacuum supply for the brakes and wind-shield wiper.

In Fig. 2, the pump 43 furnishes both vacuum and pressure and has a pressure delivery connection to the pipe 44 in addition to the suction connection. The vacuum is supplied both by the pump 43 and the connection to the inlet manifold 11 through the check valve 22 and restriction 23, as described hereinabove. Positive pressure is supplied primarily by the pump 43, but a secondary pump 48 may also be used to furnish pressure to such devices as may require it while the car is stationary, such as the fuel feed device 54. The pump 48 is of any suitable construction, and is preferably driven by the engine. If desired, however, this pump may be driven by a separate means, such as an electric motor. The second pump 48 may also be used to furnish a secondary vacuum supply through the pipe 49 and check valve 50, Fig. 2. In this case the vacuum connection to the inlet manifold may be dispensed with, though both may be used, if desired. The limiting valve 42, while limiting the vacuum in the tank 20, also provides a source of air to be compressed in addition to that derived from bleeds in the various auxiliaries. A system as above described, furnishing both pressure and vacuum, has many advantages. Obviously, by using both vacuum and positive pressure in an accessory, a greater differential pressure may be applied, rendering the accessory more powerful or decreasing its necessary size. Furthermore, the positive pressure may be used applied to the operation of various devices, such as the hydrostatic fuel gage 61 and the compressed air vaporizing jet in the carbureter 54.

In the operation of the clutch actuator by both positive pressure and vacuum, as shown in Fig. 3, when the accelerator pedal 67 is fully retracted by the action of the spring 106, as shown in the diagram, the position of the plunger 94 is such that compressed air passes from the pipe 81, through the port 97, the groove 95, the port 99 and the pipe 68 to the cylinder 83 at the right of the piston 84. At the same time a vacuum connection is open from the left end of the cylinder 83 through the pipe 69, port 100, groove 96 and port 98 to the vacuum supply pipe 74. The resulting pressure difference between the right and left sides of the piston 84 forces the latter to the left, as shown, drawing the link 85, swinging the lever 86, revolving the shaft 87 and thus disengaging the clutch. As the accelerator 67 is depressed the plunger 94 moves to the left, closing the ports 97 and 98 and causing the grooves 95 and 96 to register with the annular recess 101. The recess 101 provides a connection between the grooves 95 and 96, causing the pressure on the right and the vacuum on the left of the piston 84 to equalize through the ports 99 and 100. The cylinder pressures being equalized, the retracting spring 114 moves the lever 86, link 85 and piston 84 to the right, allowing the clutch to engage. Meanwhile the thrust collar 110 on the rod 109 engages the block 111, swinging the throttle lever 112 and opening the throttle. Should it be necessary or desirable to operate the device on pressure alone the operation takes place in the same manner as described, except that the moving force is due only to the positive pressure on the right side of the piston 84, the pressure on the left being assumed to be atmospheric. As the piston moves to the left the air in the left end of the cylinder escapes through the relief valve 91. When the accelerator is depressed and the plunger 94 moved to the left, the pressures equalize as before, any pressure above atmospheric escaping through the relief valve 91. When operated by vacuum alone, assuming no positive pressure to be available, the initial pressure in the cylinder 83 is, therefore, atmospheric. As the air is exhausted through the pipe 69, as previously described, the pressure to the left of the piston 84 falls and the atmospheric pressure on the right moves the piston inwardly, the air, meanwhile, entering through the relief valve 92 to maintain the atmospheric pressure on the right. Declutching takes place, as previously described, and when the accelerator is depressed, pressure equalization and reengagement of the clutch take place, as hereinabove described. Should manual declutching be desired, the pedal 70 is depressed. The pad 89 engages the extension 88, swinging the lever 86 to the left and throwing out the clutch. If both the motor and the car are stopped, and no residual pressure or vacuum exists in the supply tanks 20 and 45, and if the accelerator 67 is released, as shown, manual declutching forces the air out at 91 and draws the air in at 92. As the clutch pedal 70 is released the valves 91 and 92 close. Depressing the accelerator 67 allows reengagement by equalizing pressure on the two sides of the piston through the annular recess 101, as described hereinabove.

In the operation of the wind-shield wiper motor, as shown in Fig. 4, air under pressure from the branch pipe 82 enters the manifold 135 through the valve 137. The manifold 130 receives vacuum through the valve 131 from the branch vacuum pipe 75. Assuming the parts to be in the position shown, air under pressure passes through the port 133, the annular space 143 and the port 126, into the chamber 117 to the left of the vane 116. At the same time that portion of the chamber 117 to the right of the vane 116 is exhausted through the port 127, annular space 144 and port 129. The pressure difference between the sides of the vane 116 moves it clockwise, as shown by the arrow, thus turning the shaft 118 and with it the wiper sweep (not shown) and the lever 121. When the vane nears the extreme right hand position the spring 120 runs over the center, throwing the toggle lever 119 to the right and reversing the valve porting. Air under pressure enters on the right of the vane 116 and vacuum is applied on its left, returning the vane 116 to the left. When vacuum only is available, under atmospheric pressure, air enters through the relief valve 136, supplying the required pressure difference to operate the device. If positive pressure only is available, the relief valve 132 exhausts to the atmosphere, keeping down the pressure in the manifold 130 and allowing the device to operate, as already described. From the foregoing it is evident that the vane 116 will continue to oscillate, thereby operating the wiper, as long as it is supplied with air under pressure, with vacuum, or with both. To stop the wiper, the bar 138 is moved to the left, closing both the valves 131 and 137.

Referring to the diagram of the fuel feeding device shown in Fig. 5, the operation is as follows: Assuming the upper chamber 152 to be initially empty, the float 155 will have dropped, throwing the toggle levers 159 and 163 downwardly, opening the vacuum valve 165 and closing the air valve 166. The vacuum in the branch vacuum pipe 63 exhausts the upper chamber 152, holding the check valve 154 shut and drawing fuel from the low-level tank 56 through the foot valve 57 and the pipe 55 into the upper chamber 152. As the liquid level rises in the chamber 152 the float 155 is carried upwardly until it throws the toggle levers 159 and 163 upward, closing the vacuum valve 165 and opening the air valve 166. Air under pressure enters the chamber 152, raising the pressure above the liquid therein to the same value as that maintained in the lower chamber 153, due to the opening 168. The liquid head on the check valve 154 opens the latter, allowing the fuel to flow by gravity into the lower chamber 153, from which it is forced under pressure to the carbureter through the fuel pipe 58. When the consequent drop in the liquid level in the upper chamber 152 lowers the float sufficiently to throw the toggle levers 159 and 163 downward, the air valve 166 is closed and the vacuum valve 165 opened repeating the cycle. When there is a lack of positive pressure in the branch pipe 53, the relief valve 169 admits air, supplying atmospheric pressure to the air valve 166 and the lower chamber 153. In this case the device operates in the same manner as described above, except that the pressure at the carbureter is limited to the gravity head determined by the height of the liquid in the chamber 153 above the carbureter. The foot valve 57 serves in the usual manner to maintain the column of liquid in the supply pipe 55 while the discharge is taking place from the upper chamber 152 to the lower chamber 153.

In the operation of the brake booster 64 shown in Fig. 6, which represents normal position, the vacuum valves 184 and 185 are unseated, as shown, allowing vacuum from the branch pipe 73, check valve 192, hollow rod 181, and holes 199, to be applied on both sides of the piston 171 through the orifices 197 and 198. The piston is therefore balanced so far as the fluid pressures are concerned, and is held to the right by the retracting spring 37, Fig. 2. When the link 26 is drawn to the left by the operation of the brake pedal 24, Fig. 2, the retracting spring resists the movement of the tubular member 177. The inner tubular member or rod 181 is therefore moved to the left relative to the member 177 member 176 and piston 171 compressing the spring 194. The air valve 182 remains seated and the vacuum valve 184 is opened wider, compressing the spring 186. At the same time the vacuum valve 185 is seated and the air valve 183 is unseated. Air under pressure is thereby admitted through the branch pipe 80, rod 181, holes 201 chamber 179 and orifice 198, to the cylinder 17 on the right side of the piston 171. The piston 171 now moves to the left under the force due to the differential between the vacuum on its left and the pressure on its right side, drawing with it the tubular member 177, the link 28, and thus applying the brakes. The piston movement to the left continues so long as the brake pedal movement continues, to hold the inner spring 194 compressed. When the pedal movement stops the piston and members 176 and 177 overtake the inner rod 181, seating the air valve 183 and stopping the flow of air under pressure to the right side of the piston 171. The piston, therefore stops. Further depression of the pedal reopens the air valve 183 and causes a further piston movement with additional force applied to the brakes. As the pedal is released, the spring 194 moves the inner rod 181 to the right, closing the vacuum valve 184, holding the air valve 183 seated and opening the vacuum valve 185 and the air valve 182. Atmospheric air enters through the member 176, valve 182, chamber 178 and orifice 197, breaking the vacuum to the left of the piston 171. At the same time the pressure on the right of the piston 171 exhausts through the vacuum pipe 73. The piston now moves to the right, releasing the brakes until the pedal entirely released, allowing the inner rod 181 to move to the right until its stop collar 195 restrains it. The parts now assume the initial position shown in Fig. 6, vacuum being admitted to both sides of the piston 171. If air under pressure only is applied the operations are the same, except that, initially, atmospheric pressure exists on both sides of the piston 171 instead of vacuum, and the relief valve 202 serves to release air ahead of the piston 171 as the latter is moved forward by the positive pressure behind it. If vacuum only is applied, the relief valve 203 admits atmospheric pressure and the device functions in the usual manner. From the foregoing it will be noted that when both positive pressure and vacuum are applied, the differential between them can be made relatively large, resulting in large piston power in proportion to the piston area.

In the operation of the part of my invention as shown in Fig. 7, a small amount of air from the branch pressure pipe 60 passes through the porous plug 221, through or past the mercury 220, and through the porous plug 222, raising the pressure in the leg 223 and the gage line 62. The pressure is thus built up until it equals that due to the fuel head 224, meanwhile forcing the fuel from the line 62 and raising the fluid in the left leg 218 of the U-shaped tube 215. When the line 62 has been entirely cleared of fuel, any additional air entering the gage causes air to escape from the foot of the line 62 and bubble up through the fuel in the tank 56, which tank is vented to atmosphere at the top in the usual manner. The positive pressure in the right leg of the U-shaped tube is thus maintained at a value corresponding to the head 224, and the left leg 218 being vented to the atmosphere at the top, the height of fluid in the left leg 218 in reference to a proper scale such as the scale 217, gives a reading of fuel depth in the tank 56.

In the operation of the form of my invention shown in Fig. 8, air under pressure enters through the pipe 76, passes through the valve 208 into the chamber 209 and out through the opening 211 to the pressure supply line 79. Through the tube 78 the chamber 212 is maintained under vacuum corresponding to that in the vacuum supply pipe 72. The differential between the pressure in the chamber 209 and vacuum in the chamber 212 tends to force the diaphragm 204 to the right so as to close the valve 208, such movement being resisted by the spring 214. A greater degree of vacuum in the pipe 72 tends to increase the differential, further compressing the spring 214 and closing down the valves 208. The closing of the valve 208 throttles the incoming air, lowering the pressure in the chamber 209 and thus restoring the differential. Similarly, a loss of vacuum in the pipe 72 causes the spring 214 to open the valve 208 wider, increasing the pressure in the chamber 209. From the above description it is evident that the valve 77 maintains substantially a constant pressure difference between the compressed air supply and vacuum supply to the auxiliaries, thereby keeping the response of the latter uniform. It should be understood that the pressure relief or limiting valve 46 on the pressure tank 45 is set to open at a pressure above the highest pressure which is required to hold the desired differential between the pressure and vacuum supply under extreme conditions. In other words, a positive pressure in the tank 45 slightly greater than the desired differential will maintain the latter even if the vacuum should be lost altogether. Furthermore, if many accessories are operated at once, placing a heavy demand on the vacuum supply, the additional air from bleeds, equalizers, etc., supplies the extra air to the pump for maintaining the increased demand for compressed air. The response of the system is thus proportioned to the demand, so that the accessories are maintained at full effectiveness, whether working separately or all at once.

The operation of the parts shown in Fig. 11, which is an assembly of the connections for the fuel feed carbureter, windshield wiper and gasoline gage, is the same which has been described in detail in connection with the individual accessories referred to.

In the operation of the apparatus shown in Fig. 12, the auxiliary vacuum pump 248 is brought into action by the completion of the circuit through the switch arm 254 connected to the vacuum tank 20 and, therefore, the manifold 11 falls below super-atmospheric pressure so that said vacuum pump 248 will come into action to maintain the required degree of vacuum.

The operation of the apparatus shown in Fig. 13 is such that when the engine is cold the fan 262 is not operated, as the clutch band 292 is disengaged due to the expansion of the spring 287, which is stronger than the spring 299, which latter serves to maintain contact between the button 288 and the flanged head 286. Whenever the temperature of the engine rises, the valve 270 becomes unseated by reason of the elevation of the pin 269, thereby communicating the vacuum through the pipe 272 to the diaphragm 279, which causes said diaphragm to move to the left of Fig. 13, thereby withdrawing the stem 96 to the left and snapping the flanged head 297 thereof to the left beyond the spring clip 289. Thereupon the friction band 292 will be expanded so as to fit tightly within the shell 295a, thus fastening the hub 277 of the fan to the hub of the pulley 275. When closing the valve 270 the vacuum will be released by the bleed hole 271a and the spring 287 will then force the toggle levers 290 and 291 to the right, causing the head 297 to snap into its other position within the spring clip 298. This construction is of particular advantage as vacuum is supplied, not only from the manifold but from some auxiliary source of vacuum, as in the varying conditions of the engine the manifold only would not be sufficient to operate the fan at the proper times. For example, when the car is ascending a grade with wide open throttle there would be insufficient vacuum generally for the manifold to bring the fan into operation. However, with the auxiliary supply vacuum this is readily brought about. Furthermore, in my apparatus, when there is supplied a regulated and uniform degree of vacuum, the fan will be operated invariably to the degree required according to the temperature of the engine. It will of course be understood that the temperature reactive device, such as the parts shown inserted in the pipe 265, may be placed in or associated with any other part of the engine, or its associated parts, where a temperature variation takes place.

While I have described my invention above in detail I wish it to be understood that many changes may be made therein without departing from the spirit of the same.

I claim:

1. In combination, an automobile pump having a displacing element adapted to supply both pressure and vacuum, a connection therefrom for applying the pressure, another connection for supplying the vacuum having a suction relief valve therein, and an automobile accessory operated by both pressure and vacuum from the pump.

2. In an automobile, the combination of a source of vacuum and a source of gaseous fluid pressure, an accessory operated by said vacuum and pressure, means to produce a substantially constant differential between them, and a movable vacuum-responsive element to control the pressure supplied to the accessory.

3. In an automobile, the combination of a source of vacuum and a source of fluid pressure, an accessory operated by said vacuum and pressure, means to produce a substantially constant differential between them, a movable vacuum-responsive element to control the pressure supplied to the accessory, said source of vacuum being connected to the engine, and a simultaneously acting auxiliary source of vacuum driven by a traction wheel of the automobile adapted to supplement the first-mentioned source of vacuum.

4. In combination, an automobile engine having connected thereto a propeller shaft, a clutch to connect the shaft to the engine, a pump mechanically driven from the engine to provide a source of vacuum, a second pump adapted to provide an auxiliary source of vacuum mounted on the propeller shaft, and an automobile accessory adapted to be driven by the vacuum from either as well as both sources.

5. In combination, an automobile engine having connected thereto a propeller shaft, a clutch to connect the shaft to the engine, a manifold, a source of vacuum connected to the engine manifold, a pump mechanically driven from the engine to provide a source of vacuum, a pump adapted to provide an auxiliary source of vacuum mounted on the propeller shaft of the engine, and an automobile accessory adapted to be driven by the vacuum from any as well as all of the three sources.

6. In combination, a source of pressure operated by an automobile engine, a source of pressure operated by a traction wheel of an automobile driven by said engine, and an automobile accessory connected to be driven from both said sources of pressure as well as by either of said sources in case of failure of the other.

7. In combination, a source of pressure operated by an automobile engine, a source of pressure operated by a traction wheel of an automobile driven by said engine, and an automobile brake connected to be driven from both said sources of pressure as well as by either of said sources in case of failure of the other.

8. In combination, a source of pressure operated by an automobile engine, a source of pressure operated by a traction wheel of an automobile driven by said engine, and a windshield wiper connected to be driven from both said sources of pressure as well as by either of said sources in case of failure of the other.

9. In combination, a source of pressure operated by an automobile engine, a source of pressure operated by a traction wheel of an automobile driven by said engine, and a clutch connected to be driven from both said sources of pressure as well as by either of said sources in case of failure of the other.

10. In an automobile, the combination of means to provide a source of pressure differing from the atmospheric pressure, a device to provide a source of gaseous fluid pressure, and a device to provide a source of gaseous fluid pressure differing from the second-mentioned pressure, the devices for said two last-mentioned sources of pressure being interdependent and at least one of said last two mentioned pressures being connected so as to give a uniform pressure difference from said first-mentioned source of pressure.

11. In an automobile, the combination of means to provide a source of pressure differing from the atmospheric pressure, a device to provide a source of gaseous fluid pressure, and a device to provide a source of gaseous fluid pressure differing from the second-mentioned pressure, the devices for said two last mentioned sources of pressure being interdependent by means of a movable wall separating at least one of said two sources of pressure from the first-mentioned source, and at least one of said last two mentioned pressures being connected so as to give a uniform pressure difference from said first-mentioned source of pressure.

12. In an automobile, the combination of means to provide a source of pressure differing from the atmospheric pressure, a device to provide a source of gaseous fluid pressure, and a device to provide a source of gaseous fluid pressure differing from the second-mentioned pressure, the devices for said two last mentioned sources of pressure being interdependent and at least one of said last two mentioned pressures being connected so as to give a uniform pressure difference from said first-mentioned source of pressure, the second-mentioned source being directly connected to the third-mentioned source of pressure.

13. In an automobile, the combination of a part adapted to be operated by the automobile engine, a device for controlling the operation of said part, and a fluid pressure control means for controlling the operation of said device, comprising apparatus providing a source of pressure different from the atmosphere operated by the engine and apparatus providing another source of pressure different from the atmosphere connected to be operated by a traction wheel of the automobile.

14. In combination, an automobile shaft adapted to be rotated from an engine, said shaft having a bearing and a housing on the shaft, and a reciprocating pump supported on the shaft and having a reciprocating element extending into the shaft bearing housing.

15. In combination, an automobile shaft adapted to be rotated from an engine, said shaft having a bearing and a housing on the shaft, and a reciprocating pump supported on said shaft and having a reciprocating element extending into the shaft bearing housing.

16. In combination, an automobile traction engine-driven shaft having a companion flange and a rear shaft bearing, and a reciprocating pump having a casing mounted on the rear portion of the said shaft between the companion flange and the rear shaft bearing and an element attached to the shaft in the casing for operating the pump.

17. In combination, an automobile traction engine-driven shaft having a speedometer drive, a reciprocating pump comprising an eccentric splined on the said shaft, and a housing for the eccentric enclosing also the speedometer drive.

18. In combination, an automobile shaft adapted to be rotated from an engine having a bearing and a housing thereon, and a reciprocating pump having a casing thereon adapted to deliver superatmospheric pressure to one line and a sub-atmospheric pressure to another line and extending into the shaft bearing housing.

19. In combination, a pump adapted to supply superatmospheric and sub-atmospheric pressures, and a sub-atmospheric pressure regulating valve connected thereto to regulate the super-atmospheric pressure.

20. In combination, a pump adapted to supply superatmospheric and sub-atmospheric pressures, supplied by separate lines, for providing the same with pressure, a sub-atmospheric regulating valve connected thereto for regulating the super-atmospheric pressure and a pressure regulating valve for controlling the sub-atmospheric pressure.

21. In combination, a movable member, means for applying superatmospheric pressure for moving the same, and means for applying sub-atmospheric pressure for moving the same, each of said means having a vent valve normally held closed by its difference from the atmospheric pressure and adapted to open when its difference from the atmospheric pressure ceases to be operative on the movable member.

EDWARD A. ROCKWELL.